Patented July 24, 1934

1,967,400

UNITED STATES PATENT OFFICE 1,967,400

PRODUCTION OF GUANIDINO FATTY ACIDS

Siegfried Fischl, Berlin-Baumschulenweg, Germany, assignor to Schering-Kahlbaum A. G., Berlin, Germany No Drawing. Application March 11, 1931, Serial No. 521,886. In Germany March 27, 1930

5 Claims. (Cl. 260—112)

My invention refers to the production of guanidino fatty acids.

It is an object of my invention to produce these acids in a more efficient manner than was heretofore possible; to obtain better yields and to separate the acids in a particularly pure state.

It has already been proposed to prepare guanidino fatty acids by treating amino acids (of the general formula $NH_2-R-CO-OH$) with cyanamide $CN-NH_2$. In this way agmatine $C_5H_{14}N_4$ (see "Zeitschrift für physiologische Chemie", vol. 66, (1910), p. 257) and glycocyamine $C_3H_7O_2N_3$ (see "Analen der Chemie", vol. 442, (1925), p. 140) have been produced, the latter compound by the interaction of glycocoll $C_2H_5O_2N$ and sodium cyanamide. Another known method consists in heating halogen substituted fatty acids in the presence of an excess of guanidine (see "Berichte der deutschen Chemischen Gesellschaft", vol. 41 (1908), p. 4385).

A further method consists in heating amino acids with guanidine carbonate. In this way glycocyamine has been prepared (see "Journal für praktische Chemie," (2), 17, 477).

Wheeler and Merriam (Amer. Chem. Journ. 29, (1903), p. 482, 491) obtained guanidino fatty acids by treating salts of alkyl isothiourea with amino acids in the presence of a caustic soda solution.

According to my invention I produce guanidino fatty acids by the interaction of salts of S-alkyl isothiourea with amino acids in the presence of ammonia which is able to liberate S-alkyl isothiourea from its salts, but which does not dissolve guanidino fatty acids to any considerable extent. In this way I obtain particularly good yields of such guanidino fatty acids in a particularly pure state in the form of a precipitate. This result could not be foreseen, since ammonia in excess could be expected to form the salts of guanidine or alkylguanidines. However the practice has shown that such formation, at least at ordinary room temperature, does not occur to any considerable extent.

A further advantage of the new method is due to the fact, that the free alkyl isothiourea bases can be used at ordinary room temperature in great excess, thus complying with the conditions for obtaining particularly good yields. On the other hand the guanidino fatty acids, which are little soluble or practically insoluble in the weak bases, are precipitated in a substantially pure state. If, however, certain guanidino fatty acids shall be produced, which are extremely soluble in water, such as for instance α-guanidino propionic acid, they may be separated by evaporating the mother liquor in vacuo at a low temperature. In all cases particularly good yields are obtained.

If for instance creatine is prepared in accordance with my invention, 70-80 per cent of the calculated quantity of creatine

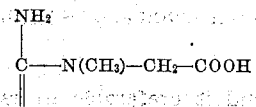

are directly obtained by crystallization, the mother liquor containing some creatinine $C_4H_7N_3O$.

In using ammonia I have ascertained that at room temperature the proportion of salts of guanidines or alkyl guanidines formed therefrom and kept in solution is altogether insignificant. While this fact could not be foreseen, it involves the important advantage, that the amino acids need not be used in a free state, which is often difficult to obtain, but may be used in the form of their salts which are more readily available.

The reaction on which my invention is based, may be expressed by the following general equation

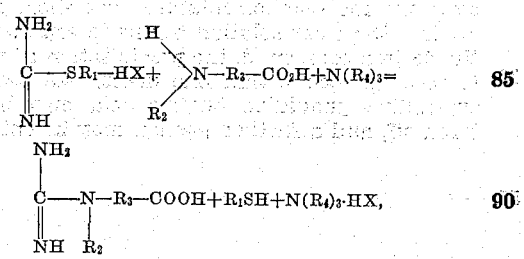

wherein $R_1$ is an alkyl group, such as methyl, ethyl and the like; $R_2$ and $R_4$ are hydrogen atoms or alkyl groups; $R_3$ is a bivalent ethylene group; and X is a monovalent acid radicle, such as Cl′, ½ SO₄″ and the like.

*Example 1*

In order to produce creatine, I dissolve 1.53 kgs. S-methyl isothiourea sulfate in 3.5 kgs. of a 25% ammonia solution, solution being promoted by slightly stirring while the mixture is maintained at room temperature. I thereafter add 0.69 kgs. sarcosine chloride

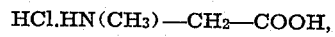

which has previously been dissolved in some aqueous ammonia. After some time the clear solution begins to separate out creatine in the form of a thick crystalline precipitate. After one night's standing the precipitation is finished and 0.56 kgs. of creatine corresponding to 77% of the calculated quantity can be filtered off in a substantially pure state, free of sulfate, sarcosine and creatinine. It may be recrystallized from 7 parts of hot water. The mother liquor from the precipitation of creatine contains a considerable content of creatine which may be separated in the usual way in the form of its complex salt with zinc chloride.

It will be understood that the employed components of the main reaction, viz. S-methyl isothiourea and sarcosine, which are originally added in the form of their sulfates and chlorides, respectively, are set free by the ammonia which is present in excess. The reaction occurring thereafter may be expressed by the following equation

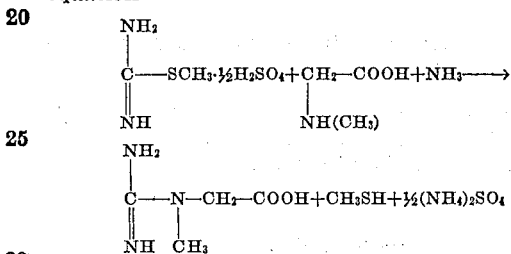

I have found it preferable to carry out this new process at room temperature, but it will be understood that the exact degree of temperature depends on various factors. As a rule, the obtained yields decrease the more the reaction temperature exceeds 15–25° C. and are improved if the reaction is carried out at still lower temperatures.

*Example 2*

In order to produce α-guanidino-n-butyric acid I first prepare at room temperature a solution of free S-alkyl isothiourea, for instance by dissolving 14 parts of its sulfate in 30 parts of a 25 per cent ammonia solution. I thereafter add a solution of 5 parts α-amino-n-butyric acid in 30 parts of a 25 percent ammonia solution. After agitating the reaction mixture for a short period of time the clear solution begins to separate out the desired compound, the precipitation of which is accomplished within one night. 4.5 parts of crystalline guanidino butyric acid may be filtered off, and a further portion may be obtained from the mother liquor by evaporation. In all 5.1 parts, corresponding to about 70 per cent of the calculated quantity are thus obtained. The guanidino acid may be recrystallized from the fifty-fold quantity of hot water, crystals in the form of short acuminate columns being obtained, which are soluble in 50 parts of hot water and melt at 244–246° C. (Ramsay "Berichte der Deutschen Chemischen Gesellschaft" vol. 41, p. 4389, ascertained the melting point of α-guanidino-n-butyric acid at 245° C.).

From the foregoing it will be understood that the formation of the α-guanidino-n-butyric acid occurs in accordance with the following equation

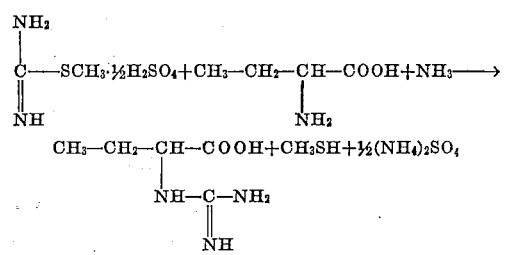

Various changes may be made in the details disclosed in the foregoing specification without departing from the invention or sacrificing the advantages thereof.

I claim:—

1. The method of producing guanidino fatty acids comprising treating a salt of S-alkyl isothiourea in solution with an amino fatty acid in the presence of an excess of ammonia.

2. The method of producing creatine comprising treating a salt of S-alkyl isothiourea in solution with sarcosine in the presence of an excess of ammonia.

3. The method of producing creatine comprising treating a salt of S-alkyl isothiourea in solution at room temperature with a sarcosine salt in the presence of an excess of ammonia.

4. The method of producing creatine comprising treating a salt of S-alkyl isothiourea in solution with sarcosine chloride in the presence of an excess of ammonia.

5. The method of producing α-guanidino-n-butyric acid comprising treating a salt of S-alkyl isothiourea in solution at room temperature with α-amino-n-butyric acid in the presence of an excess of ammonia.

SIEGFRIED FISCHL.